(12) United States Patent
Champlin

(10) Patent No.: US 6,220,604 B1
(45) Date of Patent: Apr. 24, 2001

(54) SELF-ADJUSTING INTERLOCKING BUSHING

(76) Inventor: George B. Champlin, 218 Green St., Stoneham, MA (US) 02180

( * ) Notice: Subject to any disclaimer, the term of this patent is extended or adjusted under 35 U.S.C. 154(b) by 0 days.

(21) Appl. No.: 09/085,883

(22) Filed: May 27, 1998

(51) Int. Cl.[7] .................................................. F16J 15/18
(52) U.S. Cl. ........................................ 277/511; 277/548
(58) Field of Search .................................. 277/489, 511, 277/528, 529, 530, 548, 584

(56) References Cited

U.S. PATENT DOCUMENTS

| | | | |
|---|---|---|---|
| 609,752 | * | 8/1898 | Angell ................................. 277/548 |
| 894,880 | * | 8/1908 | Garlock ................................ 277/529 |
| 1,251,807 | * | 1/1918 | Mongan ............................... 277/548 |
| 1,669,030 | * | 5/1928 | Wilkinson .......................... 277/529 |
| 1,763,127 | * | 6/1930 | Beer .................................... 277/489 |
| 1,767,498 | * | 6/1930 | Young ................................. 277/489 |
| 3,810,639 | * | 5/1974 | Scannell ............................. 277/584 |
| 3,833,228 | * | 9/1974 | Gilliam .............................. 277/530 |

* cited by examiner

*Primary Examiner*—Anthony Knight
*Assistant Examiner*—Vishal Patel
(74) *Attorney, Agent, or Firm*—Robert K. Tendler

(57) ABSTRACT

A self-adjusting interlocking throat bushing is provided in which mating concentric bushing rings are provided with an interlocking annular slot in the outer bushing ring and an annular ridge at the periphery of the inner bushing ring to hold the two rings in axial alignment when bushing is installed and the packing gland is tightened to compress the packing ring between the gland and the bushing. The annular slot/ridge structure prevents canting of the parts of throat bushing during packing ring compression thereby eliminating packing extrusion between the shaft and the annulus of the bushing. Before compression, the concentric rings are held together in alignment so that the bottom ring cannot drop out of its proper position prior to compression. After compression, the locking structure comprising the slot and ridge structure results in the bushing being compressed evenly about the shaft, thereby to eliminate misalignment and shaft sleeve wear.

4 Claims, 1 Drawing Sheet

SELF-ADJUSTING INTERLOCKING BUSHING

FIELD OF INVENTION

This invention relates to an improved self-adjusting throat bushing for extending the life of packing and more particularly to a system for preventing misalignment of the concentric bushing rings during installation and packing compression.

BACKGROUND OF THE INVENTION

As illustrated in U.S. Pat. No. 5,507,502, a packing life extended ring assembly includes first and second annular rings, with the second annular ring concentricity encircling the first ring. Both rings have tapered surfaces which mate with one another such that when placed in a stuffing box ahead of packing rings, the tapered rings self adjust during the packing compression process.

As discussed in the above-mentioned patent, slurries, abrasives, dry product and many chemicals can be hard on shaft packing. Even with sufficient flush back pressure, dimensional wear and shaft runout can render packing all but useless in a matter of weeks, or even days. Prior to the two part bushing, the only solution had been to shut down the associated system and repack the stuffing box.

One of the problems with the above-identified system for extending packing life through the utilization of concentric rings is the problem that the tapered surfaces, while adjusting in some measure for bore size and other inconsistent diameters, oftentimes result in the slipping of the inner bushing ring with respect to the outer bushing ring out of their proper position and prior to the gland being tightened down to compress the packing rings between the gland and the bottom of the stuffing box. The result is a canting of the inner ring of the throat. bushing with respect to the outer ring of the throat bushing. This causes two problems. First, with the inner ring canted with respect to the outer ring, it is possible that a void will exist between the bushing and the shaft through which packing material can and does extrude. It will be appreciated that the extrusion of the packing ring material into this space or void results in packing ring failure, to say nothing of the abrasion associated therewith.

Moreover, if the concentric bushing rings are not aligned properly, the canting of one ring with respect to the other itself wears against the shaft sleeve to accelerate sleeve wear.

Thus, not only does packing ring extrusion between the rings and the shaft result in packing ring failure, the misalignment of the concentric rings and the cocking of these rings in the stuffing box upon the compression of the packing rings scores the sleeves and again results in an unsatisfactory arrangement.

Thus, rather than extending packing life, the system of U.S. Pat. No. 5,507,502 can reduce packing life due to the inability of the concentric rings to be held in position during compression and due to uneven pressures associated with the canting.

SUMMARY OF THE INVENTION

Rather than providing smooth tapered mating surfaces between the inner and outer rings making up the self adjusting throat bushing, in the subject invention, a tongue and groove type structure is provided in the form of an annular V-shaped in slot in the annulus of the outer bushing ring which mates with a correspondingly shaped ridge at the periphery of the inner bushing ring. This maintains the rings in axial position, one with respect to the other, during the installation and compression process. The slot and ridge structure does permit lateral movement to a limited extent due to the tapered mating surfaces of the inner and outer bushing rings. However, this movement is limited due to an annular V-shape notch in the outer ring which coacts with the mating ridge in the inner ring, such that during installation the inner and outer bushing rings are maintained in position and such that during compression, equal pressures are applied about the bushing rings due to the compression of the packing rings against these throat bushing rings.

The result is that sleeve wear acceleration due to the prior art system is eliminated, while at the same time eliminating both cocking of one bushing ring with respect to the other. The further result is that extrusion of packing into the annulus between the shaft and bushing is eliminated by this ring-locking and alignment structure.

In summary, a self-adjusting interlocking throat bushing is provided in which mating concentric bushing rings are provided with an interlocking annular slot in the outer bushing ring and an annular ridge at the periphery of the inner bushing ring to hold the two rings in axial alignment when bushing is installed and the packing gland is tightened to compress the packing rings between the gland and the bushing. The annular slot/ridge structure prevents canting of the parts of throat bushing during packing ring compression thereby eliminating packing extrusion between the shaft and the annulus of the bushing. Before compression, the concentric rings are held together in alignment so that the bottom ring cannot drop out of its proper position prior to compression. After compression, the locking structure comprising the slot and ridge structure results in the bushing being compressed evenly about the shaft, thereby eliminating misalignment and shaft sleeve wear.

BRIEF DESCRIPTION OF THE DRAWINGS

These and other features of the subject invention will be better understood taken in conjunction with the Detailed Description in conjunction with the Drawings of which.

DETAILED DESCRIPTION

Figure 1:
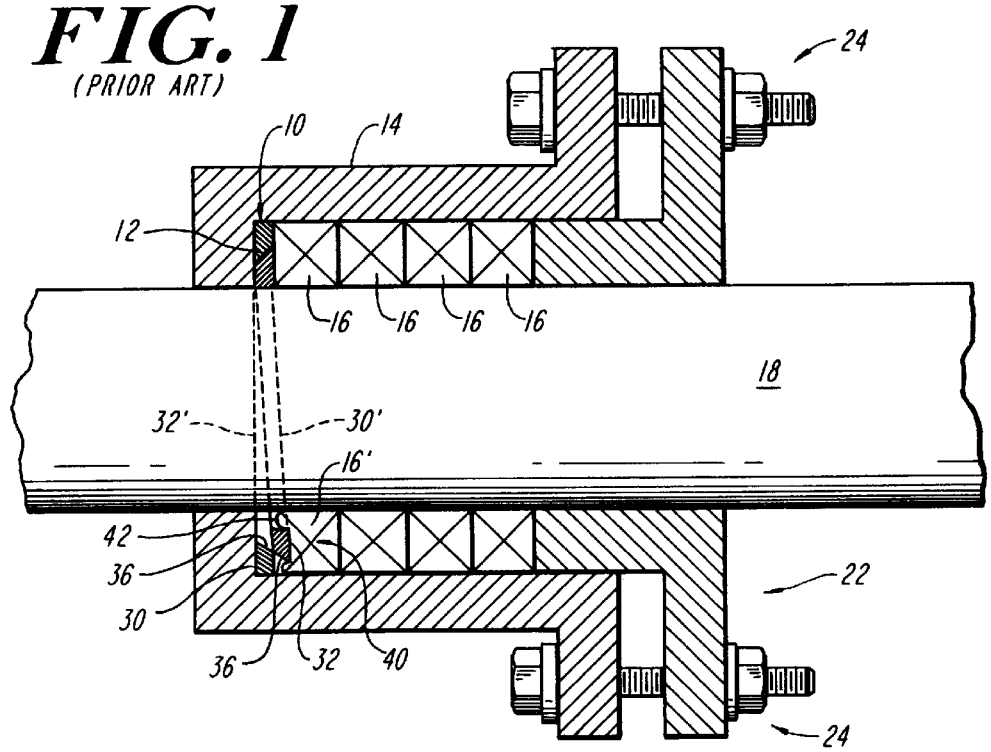
FIG. 1 is a cross-sectional and diagrammatic illustration of a prior art throat bushing, indicating the displacement of an inner ring with respect to the outer ring during installation and compression.

Referring now to FIG. 1, in one embodiment of the prior art, a throat bushing 10 is located at the bottom 12 of a stuffing box 14, with the stuffing box housing packing rings 16 which are compressed about a shaft sleeve 18 through the utilization of a packing gland 20, which is forced in the direction of arrows 22 towards the bottom of the stuffing box. The tightening of the gland on the stuffing box is accomplished through a nut and bolt assembly 24 as illustrated. Note that the rings are split to accommodate expansion and contraction and to facilitate installation about shaft sleeves without disassembly of the equipment.

It will be seen that the prior art throat bushing includes an outer ring 30 and a concentricity-carried inner ring 32 with mating portions of these concentrically-carried rings having slanted or tapered surfaces 34 and 36 respectively. When this composite throat bushing is placed in the bottom of the stuffing box and gland 20 is moved in the direction of arrows 22, then as oftentimes happens, the inner ring 30 cants as illustrated at 30' with respect to the outer ring 32 as illustrated at 32' such that the inner ring drops down as illustrated generally at 40 during the installation and compression process.

The result of canting of the inner ring with respect to the outer ring of the throat bushing causing leakage is due to the extrusion of the inner most packing ring 16' as illustrated at 42 into the annulus between the inner ring and the shaft sleeve. Moreover, the canting also causes increased scoring of the shaft sleeve such that failure is imminent.

Figure 2:
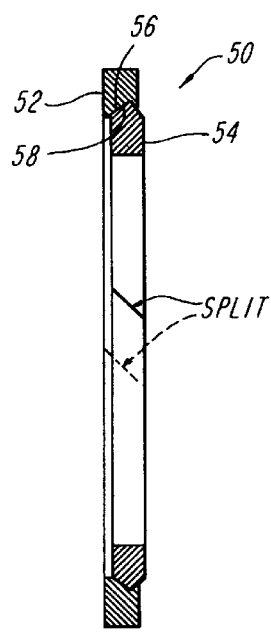
FIG. 2 is a diagrammatic illustration of the subject interlocking throat bushing showing an inner ring an outer ring, with the outer ring, with the outer ring carrying an annular ridge, which when mating lock the two portions of the throat bearing together to prevent dislodging during installation.

Referring now to FIG. 2, in order to eliminate the problems of canting of an inner ring with respect to the outer ring, with attendant packing ring extrusion and scoring of the shaft sleeve, in one embodiment, a combined throat bushing 50 is provided with an outer ring 52 and an coaxial-carried inner ring 54, wit the outer ring having a V-shaped slot or annulus 56. Inner ring 54 carries a peak-shaped or inverted V-shaped ridge 58 which fits into slot 56 such that the inner and outer rings are carried in an interlocking fashion in much the same way as a tongue and groove structure. It will be noted that both the inner and outer rings have splits 59 and 59' to permit the mounting of the rings about a shaft and to permit expansion and contraction of the respective rings when axially loaded by the packing after installation.

Figure 3:
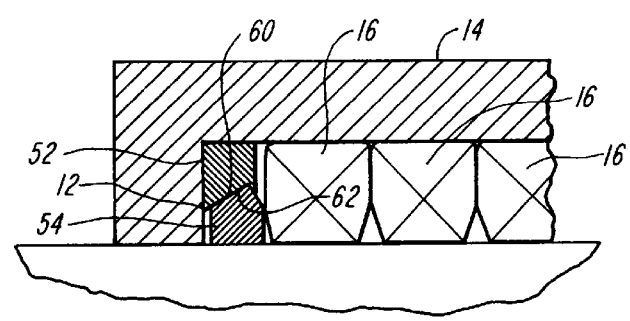
FIG. 3 is a cross-sectional illustration of a portion of the stuffing box of FIG. 1 illustrating a portion of the interlocked throat bushing prior to compression of adjacent packing rings; and, FIG. 4 is a cross-sectional illustration of a portion of the stuffing box of FIG. 1 illustrating the compression of packing rings against the subject throat bearing, illustrating locking during installation and compression.

As illustrated in FIG. 3, prior to compression of packing rings 16 via a suitable gland, the throat busing rings 52 and 54 are carried in the stuffing box between the bottom 12 of stuffing box 14 and the first adjacent uncompressed packing ring.

Figure 4:
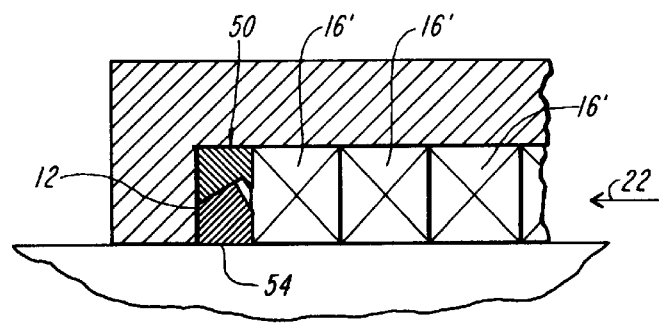

Noting that rings 52 and 54 have mating slanted surfaces 60 and 62, when as illustrated in FIG. 4, pressure is brought to bear as illustrated by arrow 22 against packing ring 16, the throat bushing 50 has its inner ring 54 moved into contact with bottom 12 of stuffing box 14, a movement permitted by the aforementioned tapered mating sides.

The compression of the packing rings is shown by reference character 16', with the result that an even pressure is brought to bear across the throat bushing during installation and compression of the packing and the throat bushing.

The interlocking nature of the throat bushing through the annular V-shaped slot and ridge structure permits self-adjustment of the throat bushing during the packing compression process, while at the same time preventing the slippage of the inner throat bushing ring with respect to the outer throat bushing ring.

In summary, due to the interlocking nature of the subject throat bushing, shaft wear is avoided, as well as the extrusion of the inner most packing ring through the annulus of the throat bushing, thereby to provide for the benefits of using a throat bushing without the aforementioned packing extrusion and shaft wear.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of the ordinary skill in the art and are contemplated as falling within the scope of the invention as limited only be appended claims and equivalents thereto.

What is claimed is:

1. A system used in a stuffing box having packing rings for preventing concentric rings forming a throat bushing from misalignment when installed in said stuffing box at the bottom thereof for preventing inflow of abrasive materials, comprising:

a self-adjusting interlocking throat bushing positioned between the bottom of said stuffing box and a packing ring;

a pair of concentric rings each having plannar sides, one of said rings having an annular periphery carrying a V-shaped ridge projecting into the annulus of the ring, the other of said rings having an asymmetrical V-shaped annular groove adapted to receive said ridge upon assembly, the planes of the sides of said rings being offset, upon compression by said gland the sides of said ring coming into alignment as the rings slide towards each other, the loose sliding fit permitting relative movement of said rings during compression to establish alignment and maintaining said one ring interlockingly connected to said other ring such that upon mounting of said throat bushing at the bottom of said stuffing box and tightening of the gland thereof, the rings adjust to prevent packing extrusion, with the coaction of the V-shaped ridge and groove preventing the rings from coming apart.

2. The system of claim 1, wherein said ridge is in the form of an inverted V.

3. The system of claim 2, wherein said slot is in the form of an inverted V.

4. The system of claim 1, wherein selected portions of the mating surfaces of said inner and outer rings include mating tapers.

* * * * *